C. H. PLUMMER.
PROCESS OF TEMPORARILY PRESERVING GREEN VEGETABLES.
APPLICATION FILED JULY 1, 1912.
1,055,353.
Patented Mar. 11, 1913.
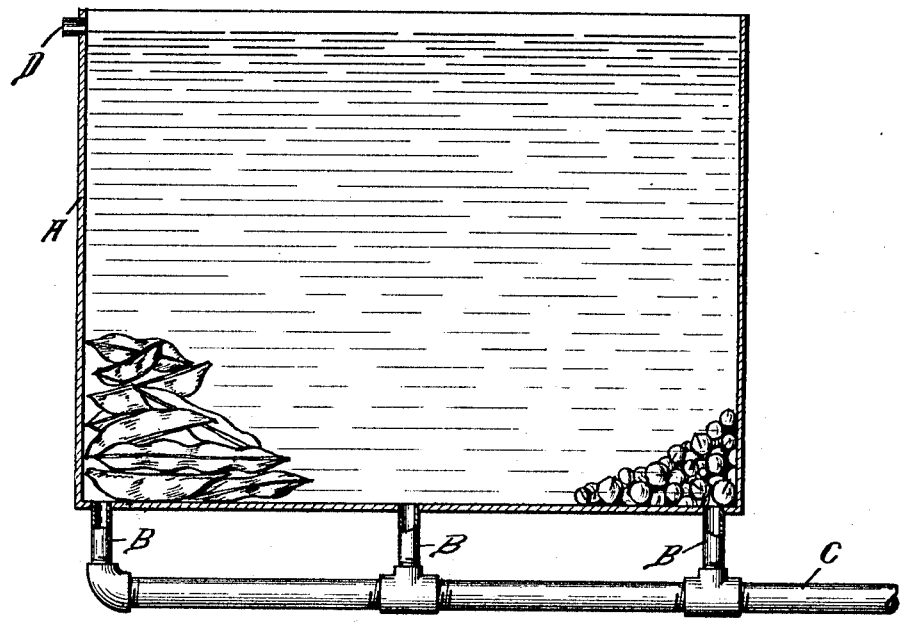
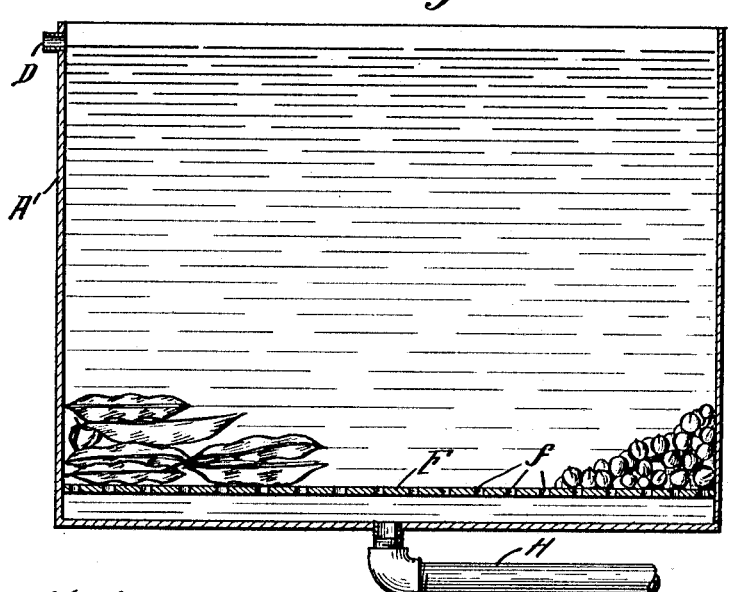
Witnesses
R. L. Farrington
L. D. Bremer
Inventor:
Clarence H. Plummer
by Erwin & Wheeler
Attys.

UNITED STATES PATENT OFFICE.

CLARENCE H. PLUMMER, OF BLACK RIVER FALLS, WISCONSIN.

PROCESS OF TEMPORARILY PRESERVING GREEN VEGETABLES.

1,055,353.

Specification of Letters Patent. Patented Mar. 11, 1913.

Application filed July 1, 1912. Serial No. 706,849.

*To all whom it may concern:*

Be it known that I, CLARENCE H. PLUMMER, a citizen of the United States, residing at Black River Falls, county of Jackson, and State of Wisconsin, have invented new and useful Improvements in Processes of Temporarily Preserving Green Vegetables, of which the following is a specification.

My invention relates to improvements in processes of temporarily preserving green peas, beans, and similar vegetables, preparatory to sterilizing and canning them.

The harvesting period for canning vegetables is comparatively brief, and it is not practicable under ordinary conditions, to sterilize and can the vegetables as fast as they are harvested. On the contrary, it is frequently necessary to prepare the vegetables for canning and can them on the day following the day on which they are harvested, and heretofore this has resulted in the loss of large quantities. Green peas are especially subject to heating or fermentation, and peas harvested during the afternoon when the temperature is high, will frequently mold before the following morning, and will always deteriorate to a considerable extent under the methods heretofore employed which involve storing them in large piles or in boxes, whereby pressure is developed at the bottom of the pile.

The object of this invention is to provide means for preserving the peas or other vegetables in their original fresh condition, until they can be sterilized and canned, and this I am able to accomplish by relieving them from heat and pressure in the interval between the harvesting and canning operation in the manner hereinafter set forth.

In the following description, reference is had to the accompanying drawings, in which—

Figure 1 is an illustration, in vertical section, of a storage receptacle for peas embodying the preferred form of apparatus for carrying out my improved process. Fig. 2 is a similar view, showing a modified form of apparatus.

Like parts are identified by the same reference characters in both views.

In carrying out my improved process, I subject the peas either in or out of the pods, to the action of an ascending current of cold water. In the drawing, I have illustrated a receptacle A, adapted to receive the peas and provided with pipe connections B leading to the bottom of the receptacle from a suitable main C, connected with a source of water supply. The receptacle is provided with an overflow, or preferably a series of overflows D, at the top, whereby the water may escape after circulating through the contents of the receptacle. The specific gravity of these vegetables is not much greater than that of the water, which circulates among them, and as the water is preferably permitted to enter the receptacle at the bottom, it has a tendency to lift the vegetables and prevent them from pressing upon each other to an injurious extent. The vegetables being relieved of pressure, it is obvious that the water will circulate freely among them. Cold water is employed and the heat of the vegetables is absorbed by it and carried away in the overflow, thereby keeping the vegetables cool and fresh, as well as free from pressure. Experiments have demonstrated that stagnant water, however cold when applied to the vegetables, does not efficiently preserve them for even a short or over-night period. This is partly due to the fact that the stagnant water does not prevent the vegetables from settling together, and partly to the fact that the water becomes warm from the absorbed heat. I have found that flowing water, even though comparatively warm, is much more efficacious than stagnant water applied at any temperature.

The specific form of apparatus illustrated is not essential. In Fig. 2 I have illustrated a receptacle A' having a false bottom F, having a series of openings *f*, through which water may pass from the space between the false bottom and the bottom *a*. With this arrangement, the fresh water may be admitted to such space through a single pipe H.

It is not essential that the water be kept in continuous motion during the entire period that the peas are being stored, preparatory to the sterilizing and canning operations, for I have found that by continuing the circulation of water until the peas are thoroughly cooled, the flow may then be stopped for a considerable period without material injury to the vegetables. For example, I find that after the peas have been subjected to the current of water for a period ranging from 15 minutes to an hour, the flow of water may then be stopped for several hours and the period of required circulation depends in duration to a large extent upon the quantity in the receptacle and upon the temperature conditions at the time of harvesting, also upon the temperature of the water employed. Where the mass of peas is large, it will settle more quickly and with greater pressure than where a comparatively small quantity of peas is contained in the receptacle. Ordinarily, receptacles will be employed of such size that by maintaining a water flow for an initial period of from one-half hour to an hour, and subsequently for periods of from 15 to 30 minutes in from four to six hour intervals, the peas will be preserved in a fresh condition. Where harvested during the afternoon, and thoroughly chilled during the initial period of water flow, the water should be turned on once or twice during the night for a sufficient length of time to completely change the water in the tank. The introduction of fresh water changing the water in the tank, will of course take place with sufficient frequency to prevent the temperature from rising to a point favorable to fermentation.

I claim—

1. The process of temporarily preserving green vegetables, such as peas and beans, consisting in subjecting them to an upwardly flowing stream of cool water, substantially as described.

2. The process of temporarily preserving green vegetables, such as peas and beans, consisting in 1st, storing them in a suitable receptacle, and 2nd, in subjecting them to the action of a moving body of cool water for a sufficient period to reduce their temperature approximately to that of the water, substantially as described.

3. The process of temporarily preserving green vegetables, such as peas and beans, consisting in 1st, immersing said vegetables in cool water, and 2nd, in introducing additional water and causing the same to flow through the vegetables at sufficiently frequent intervals to prevent the temperature from rising sufficiently to permit fermentation.

In testimony whereof I affix my signature in the presence of two witnesses.

CLARENCE H. PLUMMER.

Witnesses:
LEVERETT C. WHEELER,
IRMA D. BREMER.

Copies of this patent may be obtained for five cents each, by addressing the "Commissioner of Patents, Washington, D. C."